US009245688B2

(12) United States Patent
Shiota

(10) Patent No.: US 9,245,688 B2
(45) Date of Patent: Jan. 26, 2016

(54) MONOLITHIC CERAMIC CAPACITOR

(75) Inventor: Akihiro Shiota, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 464 days.

(21) Appl. No.: 13/491,627

(22) Filed: Jun. 8, 2012

(65) Prior Publication Data

US 2012/0257322 A1    Oct. 11, 2012

Related U.S. Application Data

(63) Continuation of application No. PCT/JP2010/072217, filed on Dec. 10, 2010.

(30) Foreign Application Priority Data

Dec. 11, 2009  (JP) ................. 2009-281685

(51) Int. Cl.
| | |
|---|---|
| H01G 4/06 | (2006.01) |
| H01G 4/30 | (2006.01) |
| H01G 4/012 | (2006.01) |
| H01G 4/12 | (2006.01) |

(52) U.S. Cl.
CPC .............. *H01G 4/30* (2013.01); *H01G 4/012* (2013.01); *H01G 4/12* (2013.01)

(58) Field of Classification Search
CPC ....... H01G 4/30; H01G 4/232; H01G 4/1227; H01G 4/0085; H01G 4/12; H01L 28/55; H01L 28/60
USPC ................. 361/321.1–321.2, 301.4
See application file for complete search history.

(56) References Cited

U.S. PATENT DOCUMENTS

| | | | | |
|---|---|---|---|---|
| 7,431,911 B2* | 10/2008 | Shirakawa et al. | ........... | 423/598 |
| 2010/0085682 A1 | 4/2010 | Abe et al. | | |

FOREIGN PATENT DOCUMENTS

| | | |
|---|---|---|
| JP | 59-222917 A | 12/1984 |
| JP | 60-124813 A | 7/1985 |
| JP | 61-15315 A | 1/1986 |
| JP | 61-237413 A | 10/1986 |
| JP | 61-248413 A | 11/1986 |
| JP | 3-241802 A | 10/1991 |

(Continued)

OTHER PUBLICATIONS

Official Communication issued in corresponding Japanese Patent Application No. 2011-545262, mailed on Aug. 7, 2012.

(Continued)

*Primary Examiner* — David M Sinclair
*Assistant Examiner* — Arun Ramaswamy
(74) *Attorney, Agent, or Firm* — Keating & Bennett, LLP

(57) ABSTRACT

A monolithic ceramic capacitor having a large capacity and high reliability includes a ceramic sintered body including a plurality of stacked ceramic layers, and first and second inner electrodes and alternately disposed inside the ceramic sintered body to be opposed to each other in a stacking direction of the ceramic layers with one of the ceramic layers being interposed between the adjacent first and second inner electrodes. The ceramic sintered body includes a first portion in which the first and second inner electrodes are opposed to each other, and a second portion positioned outside the first portion. A ratio ($I_c/I_a$) of c-axis peak intensity ($I_c$) to a-axis peak intensity ($I_a$) measured with an XRD analysis of the one of the ceramic layers is about 2 or more.

3 Claims, 6 Drawing Sheets

(56) References Cited

FOREIGN PATENT DOCUMENTS

| | | | |
|---|---|---|---|
| JP | 3-241813 A | 10/1991 |
| JP | 4-280411 A | 10/1992 |
| JP | 05-175073 A | 7/1993 |
| JP | 6-013259 A | 1/1994 |
| JP | 6-349669 A | 12/1994 |
| JP | 6-349672 A | 12/1994 |
| JP | 7-122455 A | 5/1995 |
| JP | 9-153433 A | 6/1997 |
| JP | 10-308322 A | 11/1998 |
| JP | 2002-198255 A | 7/2002 |
| JP | 2003-318060 A | 11/2003 |
| JP | 2004-152909 A | 5/2004 |
| JP | 2005-109218 A | 4/2005 |
| JP | 2005-123554 A | 5/2005 |
| JP | 2005-259772 A | 9/2005 |
| JP | 2005259772 A * | 9/2005 |
| JP | 2010-092896 A | 4/2010 |
| JP | 2010-093037 A | 4/2010 |
| JP | 2010-093038 A | 4/2010 |
| JP | 2012-094819 A | 5/2012 |
| JP | 2012-094820 A | 5/2012 |

OTHER PUBLICATIONS

Official Communication issued in International Patent Application No. PCT/JP2010/072217, mailed on Mar. 15, 2011.

Yamashita; "Monolithic Ceramic Electronic Component"; U.S. Appl. No. 13/491,625, filed Jun. 8, 2012.

Fukunaga et al.; "Monolithic Ceramic Capacitor"; U.S. Appl. No. 13/491,626, filed Jun. 8, 2012.

Yamashita et al.; "Multilayer Ceramic Electronic Component", U.S. Appl. No. 13/491,624, filed Jun. 8, 2012.

* cited by examiner

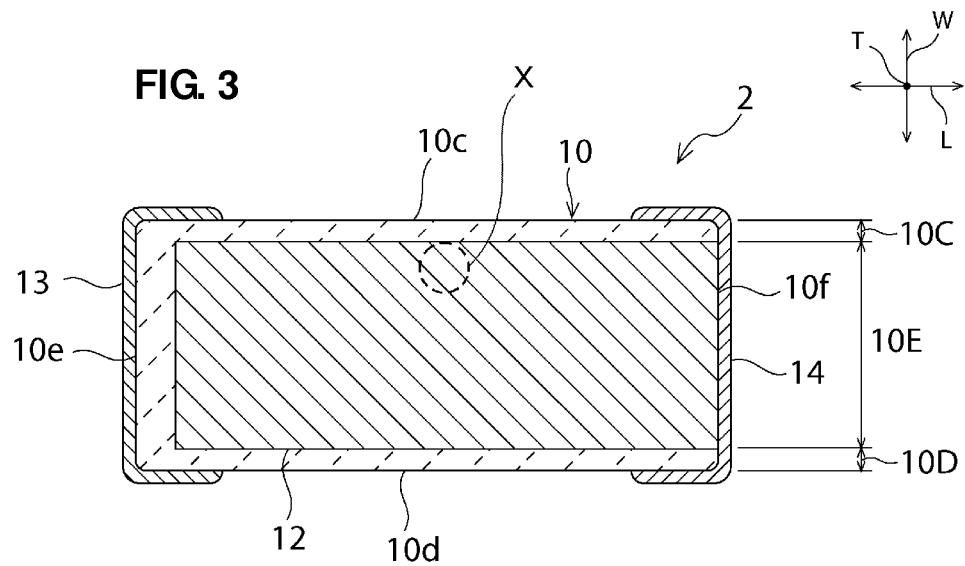
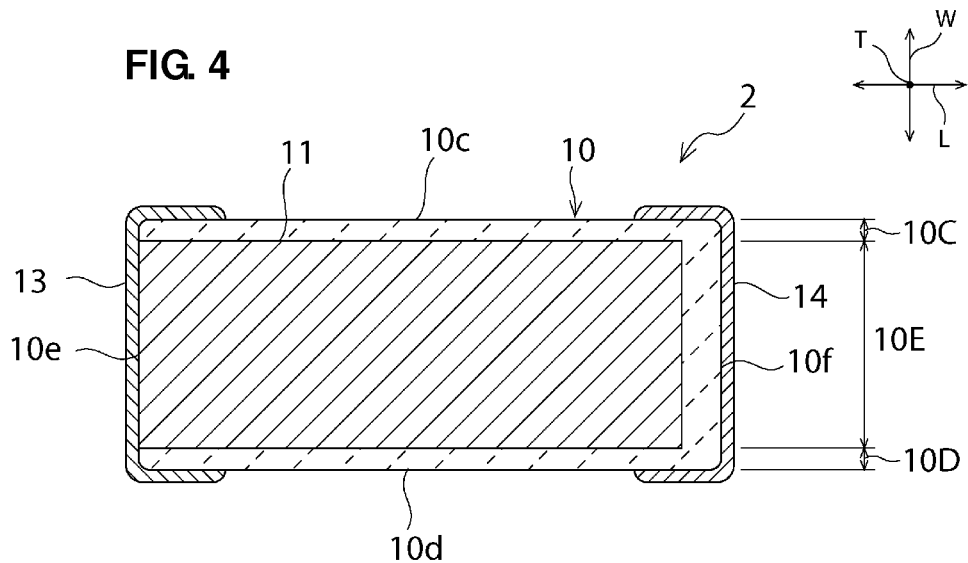

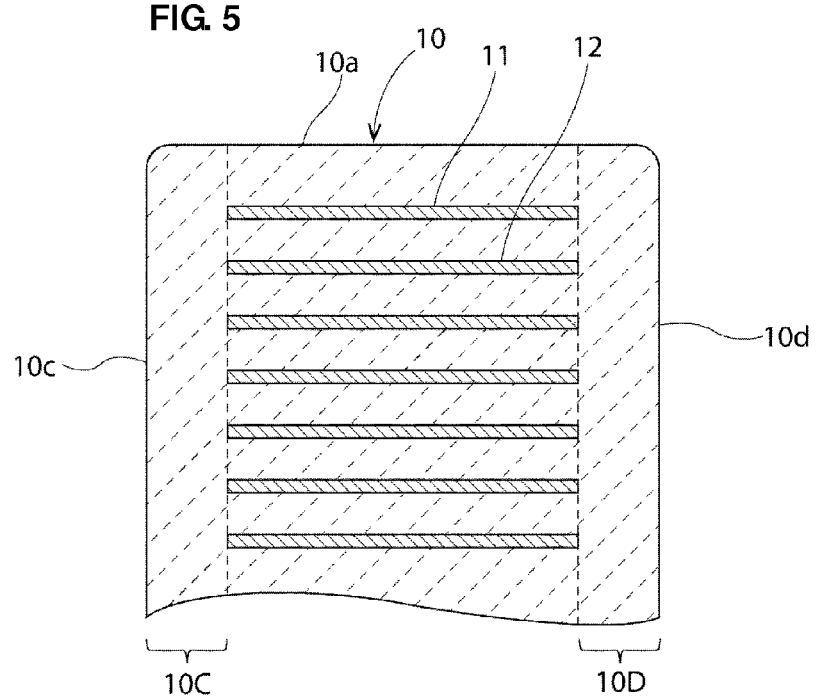
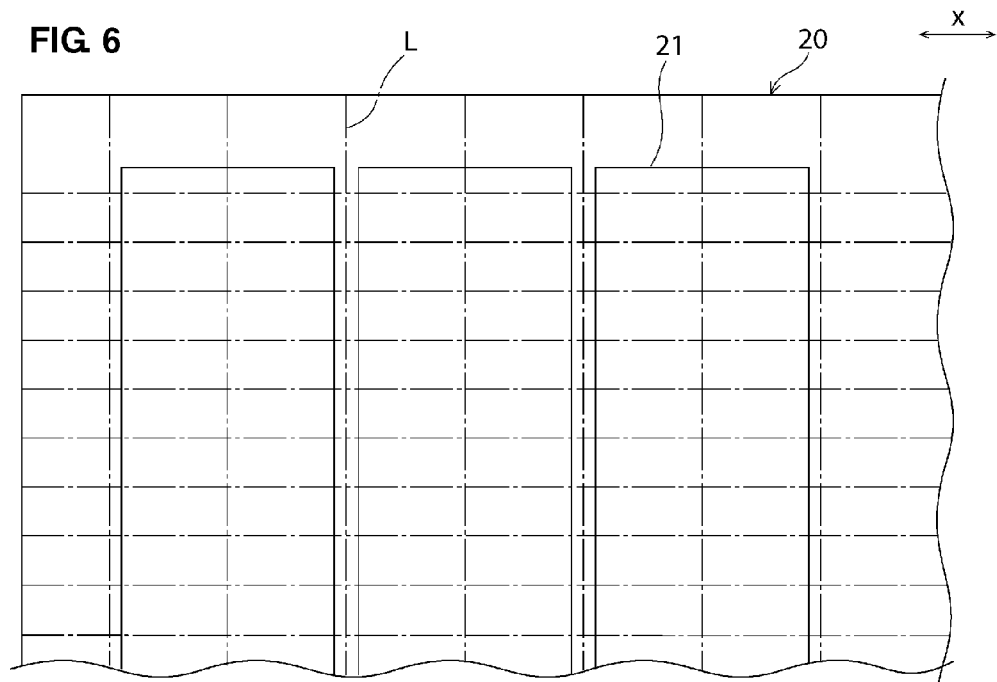

MONOLITHIC CERAMIC CAPACITOR

BACKGROUND OF THE INVENTION

1. Field of the Invention

The present invention relates to a monolithic ceramic capacitor. In particular, the present invention relates to a monolithic ceramic capacitor including a ceramic sintered body and a plurality of first and second inner electrodes that are alternately disposed inside the ceramic sintered body to be opposed to each other with a ceramic layer interposed between the adjacent first and second inner electrodes.

2. Description of the Related Art

Monolithic ceramic capacitors have been used in many electronic devices, such as cellular phones and notebook personal computers.

With a recent trend toward smaller sizes and larger capacities of electronic devices in which monolithic ceramic capacitors are mounted, demands for smaller sizes and larger capacities of the monolithic ceramic capacitors have also increased more and more. In such a situation, monolithic ceramic capacitors having smaller sizes and larger capacities and methods of manufacturing them are variously proposed as described in Japanese Unexamined Patent Application Publication No. 2003-318060, for example.

One example of methods for increasing the capacity of a monolithic ceramic capacitor is to reduce the thickness of a ceramic layer interposed between electrodes. However, a grain size has to be reduced in order to reduce the thickness of the ceramic layer. Reducing the grain size requires a pulverizing step to be performed for a longer time. Accordingly, a manufacturing time is prolonged and a manufacturing cost is increased. Another problem is that, when the ceramic layer is thin, dielectric breakdown is apt to occur and reliability of the ceramic capacitor is degraded.

SUMMARY OF THE INVENTION

In view of the problems mentioned above, preferred embodiments of the present invention provide a monolithic ceramic capacitor having a large capacity and high reliability.

A monolithic ceramic capacitor according to a preferred embodiment of the present invention includes a ceramic sintered body and first and second inner electrodes. The ceramic sintered body includes a plurality of stacked ceramic layers. The first and second inner electrodes are alternately disposed inside the ceramic sintered body to be opposed to each other in a stacking direction of the ceramic layers with one of the ceramic layers being interposed between the adjacent first and second inner electrodes. The ceramic sintered body includes a first portion and a second portion. The first portion is a region in which the first and second inner electrodes are opposed to each other. The second portion is positioned outside the first portion. In the first portion, the ceramic layers are oriented in the stacking direction. A ratio (Ic/Ia) of c-axis peak intensity (Ic) to a-axis peak intensity (Ia) measured with an XRD analysis of the one of the ceramic layers is about 2 or more.

In a preferred embodiment of the monolithic ceramic capacitor according to the present invention, the ceramic sintered body is a parallelepiped ceramic sintered body including first and second principal surfaces extending in a lengthwise direction and a widthwise direction perpendicular to the lengthwise direction, first and second lateral surfaces extending in a thickness direction perpendicular to both the lengthwise direction and the widthwise direction and in the lengthwise direction, and first and second end surfaces extending in the widthwise direction and the thickness direction. The first portion is an opposed portion in which the first and second inner electrodes are opposed to each other. The second portion includes not-opposed portions, which are positioned in both sides of the opposed portion in the lengthwise direction and in which the first and second inner electrodes are not opposed to each other, and side gap portions, which are positioned in both sides of the opposed portion in the widthwise direction and in which the first and second inner electrodes are both not disposed.

In another preferred embodiment of the monolithic ceramic capacitor according to the present invention, a proportion of an area occupied by the first portion in the ceramic sintered body is about 80% or more when viewed from the stacking direction.

In still another preferred embodiment of the monolithic ceramic capacitor according to the present invention, a length of each of the side gap portions in the widthwise direction is about 45 µm or less.

In still another preferred embodiment of the monolithic ceramic capacitor according to the present invention, a length of each of the not-opposed portions in the lengthwise direction is about 57.5 µm or less.

In various preferred embodiments of the present invention, the ratio (Ic/Ia) of the c-axis peak intensity (Ic) to the a-axis peak intensity (Ia) measured with the XRD analysis of the ceramic layer is about 2 or more. Therefore, the polarizability of the ceramic layer in the first portion can be increased. As a result, a larger capacity can be obtained without excessively reducing the thickness of the ceramic layer. It is hence possible to provide the monolithic ceramic capacitor having a large capacity and high reliability.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a sectional view taken along a line III-III in FIG. 2.

FIG. 4 is a sectional view taken along a line IV-IV in FIG. 2.

FIG. 5 is a partial enlarged sectional view of a cross-section taken along a line V-V in FIG. 1.

FIG. 6 is a schematic plan view of a ceramic green sheet on which conductor patterns are printed.

DETAILED DESCRIPTION OF THE PREFERRED EMBODIMENTS

First Preferred Embodiment

Figure 1:
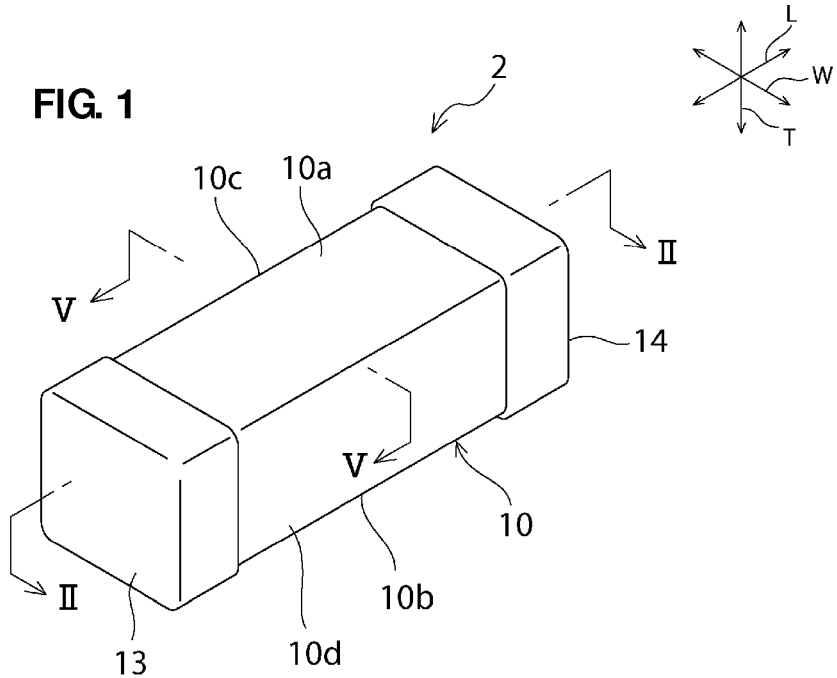
FIG. 1 is a schematic perspective view of a ceramic capacitor according to a first preferred embodiment of the present invention.
Figure 2:
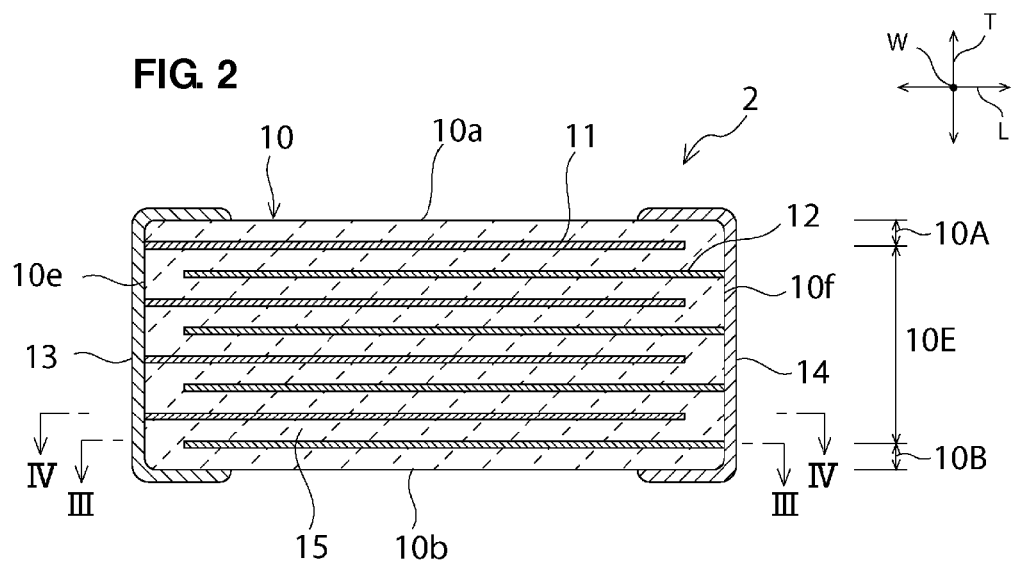
FIG. 2 is a sectional view taken along a line II-II in FIG. 1.

FIG. 1 is a schematic perspective view of a ceramic capacitor according to a first preferred embodiment of the present invention. FIG. 2 is a schematic sectional view taken along a line II-II in FIG. 1. FIG. 3 is a schematic sectional view taken along a line III-III in FIG. 2. FIG. 4 is a schematic sectional view taken along a line IV-IV in FIG. 2.

A monolithic ceramic capacitor 2 according to the present preferred embodiment includes a ceramic sintered body 10 having a parallelepiped shape. The ceramic sintered body 10 includes first and second principal surfaces 10a and 10b, first and second lateral surfaces 10c and 10d, and first and second end surfaces 10e and 10f. The first and second principal surfaces 10a and 10b extend in a lengthwise direction L and a widthwise direction W. The first and second lateral surfaces 10c and 10d extend in the lengthwise direction L and a thickness direction T. The first and second end surfaces 10e and 10f extend in the widthwise direction W and the thickness direction T.

It is to be noted that, in preferred embodiments of the present invention, the term "parallelepiped" includes such a shape that at least portions of corners and/or ridges are chamfered or rounded.

Dimensions of the ceramic sintered body 10 are not limited to particular ones. A length of the ceramic sintered body 10 in the lengthwise direction L can be set to, e.g., about 0.4 mm to about 3.2 mm. A length of the ceramic sintered body 10 in the widthwise direction W can be set to, e.g., about 0.2 mm to about 2.6 mm. A length of the ceramic sintered body 10 in the thickness direction T can be set to, e.g., about 0.2 mm to about 2.6 mm.

The ceramic sintered body 10 includes a plurality of stacked ceramic layers 15 (see FIGS. 2 and 4). The ceramic layers 15 are each made of a ceramic material containing ceramic. The ceramic material may contain, in addition to the ceramic, firing aids such as Si, Mg, B and glass components.

The ceramic layers 15 are each made of a dielectric ceramic. A ceramic containing barium titanate as a main component and having a crystal lattice of the perovskite structure is preferably used as the dielectric ceramic, for example. The dielectric ceramic may be added, as appropriate, with auxiliary components, e.g., a Mn compound, a Mg compound, a Si compound, a Co compound, a Ni compound, and a rare-earth compound.

As illustrated in FIGS. 2 to 5, a plurality of first and second inner electrodes 11 and 12 are disposed inside the ceramic sintered body 10. The first and second inner electrodes 11 and 12 are each disposed parallel or substantially parallel to the first and second principal surfaces 10a and 10b. Each of the first and second inner electrodes 11 and 12 preferably has a rectangular or substantially rectangular shape in plan view. The plurality of first and second inner electrodes 11 and 12 are alternately disposed to be opposed to each other in the thickness direction T. In other words, the first and second inner electrodes 11 and 12 are arranged to face each other in the thickness direction T in such a state that the ceramic layers 15 disposed inside the ceramic sintered body 10 are interposed respectively between the adjacent first and second inner electrodes 11 and 12.

A layer thickness of the ceramic layer 15 is preferably in the range of about 0.3 μm to about 2 μm, for example. Also, a thickness of each of the first and second inner electrodes 11 and 12 is preferably in the range of about 0.2 μm to about 1 μm, for example. A layer thickness of the ceramic layer 15 is preferably in the range of one to three times the thickness of each of the first and second inner electrodes 11 and 12.

The first inner electrodes 11 are exposed to the first end surface 10e, but they are not exposed to the second end surface 10f, the first and second principal surfaces 10a and 10b, and the first and second lateral surfaces 10c and 10d. On the other hand, the second inner electrodes 12 are exposed to the second end surface 10f, but they are not exposed to the first end surface 10e, the first and second principal surfaces 10a and 10b, and the first and second lateral surfaces 10c and 10d.

A first outer electrode 13 is disposed on the first end surface 10e. The first outer electrode 13 is connected to the first inner electrodes 11. On the other hand, a second outer electrode 14 is disposed on the second end surface 10f. The second outer electrode 14 is connected to the second inner electrodes 12.

Materials of the first and second inner electrodes 11 and 12 and the first and second outer electrodes 13 and 14 are not limited to particular ones as long as the materials are electrically conductive. The first and second inner electrodes 11 and 12 and the first and second outer electrodes 13 and 14 can be made of, e.g., a metal such as Ag, Au, Pt, Pd, Ni, Cr, Al or Cu, or an alloy containing one or more of those metals. Further, the first and second inner electrodes 11 and 12 and the first and second outer electrodes 13 and 14 may be each formed as a laminate including multiple conductive films.

As illustrated in FIGS. 3 to 5, the ceramic sintered body 10 includes first and second outer layer portions 10A and 10B, first and second side gap portions 10C and 10D, and an inner layer portion 10E.

The first and second outer layer portions 10A and 10B indicate portions that are positioned outside a portion where the first and second inner electrodes 11 and 12 are disposed, when viewed in a direction (=thickness direction T) in which the first and second inner electrodes 11 and 12 are opposed to each other. More specifically, in this preferred embodiment, the first and second outer layer portions 10A and 10B are disposed respectively at opposite end portions of the ceramic sintered body 10 in the thickness direction T.

The first and second side gap portions 10C and 10D indicate portions where the first and second inner electrodes 11 and 12 are both not disposed, when viewed from the direction (=thickness direction T) in which the first and second inner electrodes 11 and 12 are opposed to each other. More specifically, in this preferred embodiment, the first and second side gap portions 10C and 10D are disposed respectively at opposite end portions of the ceramic sintered body 10 in the widthwise direction W.

The inner layer portion 10E indicates a portion of the ceramic sintered body 10 except for the first and second outer layer portions 10A and 10B and the first and second side gap portions 10C and 10D. More specifically, in this preferred embodiment, the inner layer portion 10E is positioned in a region of the ceramic sintered body 10 except for the opposite end portions in the thickness direction T and the opposite end portions in the widthwise direction W. Thus, the inner layer portion 10E includes a portion where the first and second inner electrodes 11 and 12 are opposed to each other in the thickness direction T, and a portion where only either the first or second inner electrodes 11 or 12 are disposed when viewed from the thickness direction T.

In this preferred embodiment, in an opposed portion constituting a first portion, a ratio (Ic/Ia) of c-axis peak intensity (Ic) to a-axis peak intensity (Ia) measured with an X-ray analysis (XRD analysis) in a stacking direction is about 2 or more. This indicates that, in the first portion where electrostatic capacity is to be obtained, the c-axis arrangement in a crystal lattice of the ceramic is in a state aligned parallel to the stacking direction at a larger proportion. Therefore, the polarizability of the ceramic layer 15 in the opposed portion (first portion) can be increased. As a result, a capacity of the monolithic ceramic capacitor 2 can be increased without excessively reducing the thickness of the ceramic layer 15.

Further, since the dielectric constant of the ceramic material is not required to be very large, it is possible to suppress a reduction of reliability, which reduction may be caused by a process of growing ceramic particles with the intent to increase the dielectric constant. Accordingly, the monolithic ceramic capacitor 2 having a large capacity and high reliability can be provided.

From the viewpoint of increasing the polarizability of the ceramic layer 15 and realizing higher performance, the ratio (Ic/Ia) of the c-axis peak intensity (Ic) to the a-axis peak intensity (Ia) (hereinafter referred to simply as the "ratio (Ic/Ia)") measured with the X-ray analysis (XRD analysis) in the stacking direction of the ceramic layers is preferably about 2 or more in the opposed portion constituting the first portion.

The ratio (Ic/Ia) can be controlled by adjusting a proportion of an area occupied by the opposed portion (first portion) in the ceramic sintered body 10 when viewed from the widthwise direction W (stacking direction). In more detail, as described later, the ratio (Ic/Ia) can be increased by reducing widths of the side gap portions 10C and 10D, to thereby increase the proportion of the area occupied by the opposed portion 10E1 (first portion) in the ceramic sintered body 10. Such a result is presumably attributable to the fact that, because the widths of the side gap portions 10C and 10D are reduced, a difference in shrinkage amount between the side gap portions 10C, 10D and the opposed portion in the thickness direction T is reduced during firing, such that compressive stress exerted on the opposed portion in the thickness direction T is reduced.

The ratio (Ic/Ia) can also be increased by additionally attaching the side gap portions 10C and 10D later. This is presumably attributable to the fact that, because a level difference is not generated between the opposed portion and the side gap portions in the widthwise direction W, a difference in shrinkage amount between the side gap portions and the opposed portion in the thickness direction T is reduced during firing, such that compressive stress exerted on the opposed portion in the thickness direction T is reduced. In order to increase the ratio (Ic/Ia) to be about 2 or more, the proportion of the area occupied by the opposed portion (first portion) in the ceramic sintered body 10, when viewed from the stacking direction, is preferably about 80% or more, for example.

A non-limiting example of a method of manufacturing the monolithic ceramic capacitor 2 according to a preferred embodiment of the present invention will be described below with reference to FIGS. 6 to 8.

First, a ceramic green sheet 20, illustrated in FIG. 6, is formed. A method of forming the ceramic green sheet 20 is not limited to particular one. The ceramic green sheet 20 can be formed by using, e.g., a die coater, a gravure coater, or a micro-gravure coater.

Next, conductor patterns 21 are formed on the ceramic green sheet 20. The conductor patterns 21 serve to form the first and second inner electrodes 11 and 12. A method of forming the conductor patterns 21 is not limited to particular one. The conductor patterns 21 can be formed by, e.g., a screen printing method, an ink jet method, or a gravure printing method.

Next, the ceramic green sheets 20, including the conductor patterns 21 formed thereon, are stacked to form a laminate. In more detail, plural ceramic green sheets 20, each not including the conductor patterns 21 formed thereon, are first stacked one above another. Then, plural ceramic green sheets 20, each including the conductor patterns 21 formed thereon, are stacked in such a state that the ceramic green sheets 20 are alternately shifted to one side and to the other side in an x-direction. Further, plural ceramic green sheets 20, each not including the conductor patterns 21 formed thereon, are stacked successively, thus completing the laminate. Here, the ceramic green sheets 20, each not including the conductor patterns 21 formed thereon, which are stacked first and last, serve to form the first and second outer layer portions 10A and 10B.

Figure 7:
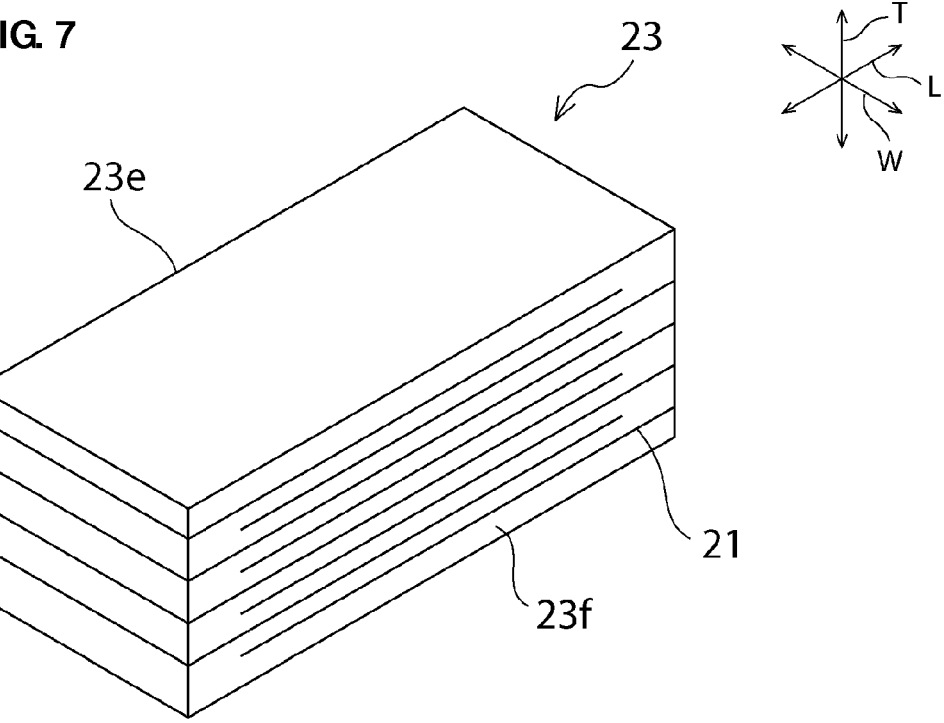
FIG. 7 is a schematic perspective view of a ceramic member.

Next, the laminate is cut along imaginary cut lines L illustrated in FIG. 6, thereby forming a plurality of parallelepiped ceramic members 23, one of which is illustrated in FIG. 7. The laminate can be cut by dicing or push cutting. Alternatively, the laminate may be cut by using a laser.

Figure 8:
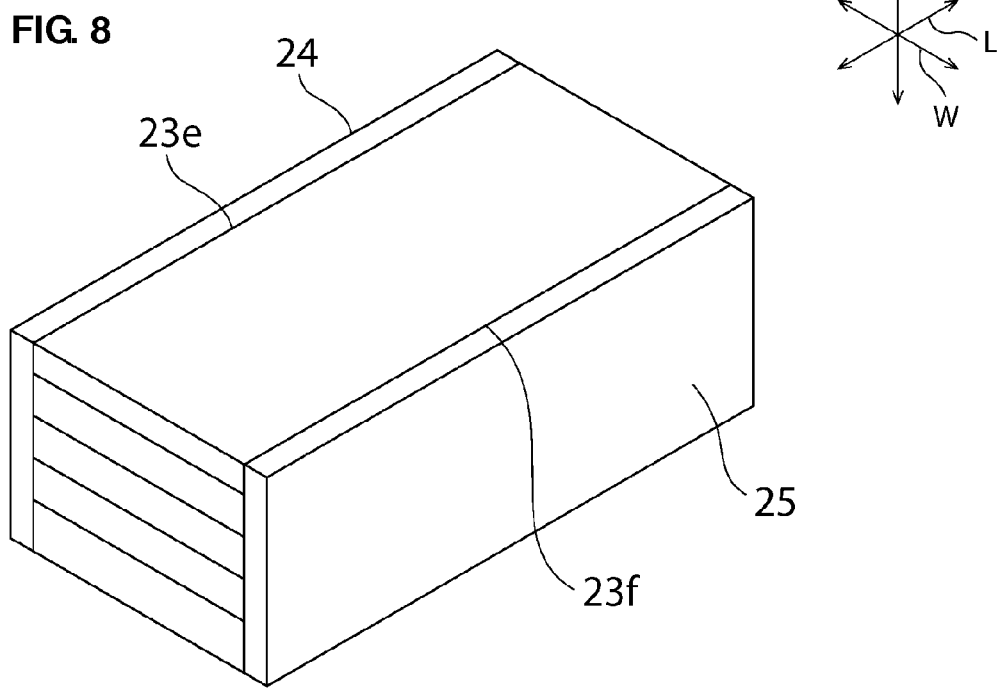
FIG. 8 is a schematic perspective view illustrating a step of forming ceramic layers on both lateral surfaces.

Next, as illustrated in FIG. 8, ceramic layers 24 and 25 are formed on lateral surfaces 23e and 23f of the ceramic member 23, respectively, so as to cover the lateral surfaces 23e and 23f. The ceramic layers 24 and 25 serve to form the first and second side gap portions 10C and 10D, respectively.

A method of forming the ceramic layers 24 and 25 is not limited to particular one. The ceramic layers 24 and 25 can be formed by, e.g., a printing method such as screen printing, an ink jet method, a coating method such as gravure coating, or an atomizing method.

Next, the ceramic member 23 including the ceramic layers 24 and 25 formed thereon is sintered. The ceramic sintered body 10 is thereby completed.

Finally, by forming the first and second outer electrodes 13 and 14, the monolithic ceramic capacitor 2 is completed. A method of forming the first and second outer electrodes 13 and 14 is not limited to any particular one. The first and second outer electrodes 13 and 14 may be formed, for example, by coating a conductive paste and then baking it. In such a case, the conductive paste may be coated before firing the ceramic member 23, and the first and second outer electrodes 13 and 14 may be formed at the same time as the firing. As another example, the first and second outer electrodes 13 and 14 may be formed by, e.g., plating.

Second Preferred Embodiment

Figure 9:
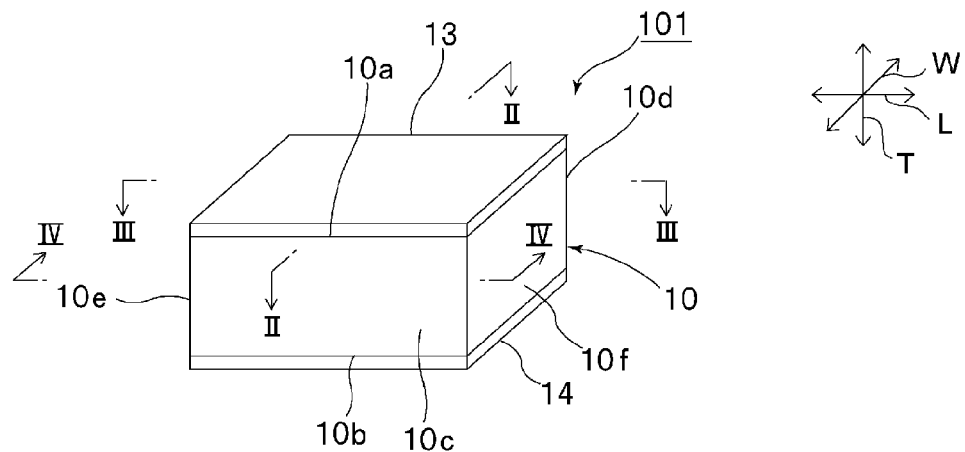
FIG. 9 is a schematic perspective view of a ceramic capacitor according to a second preferred embodiment of the present invention.
Figure 10:
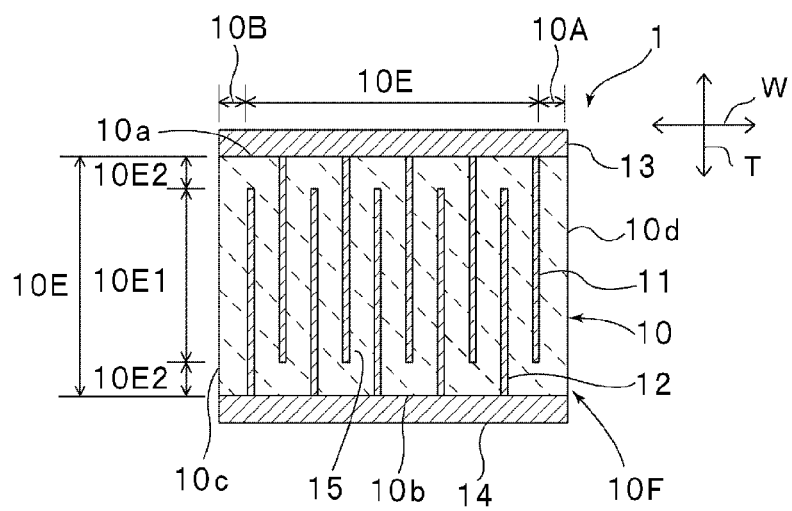
FIG. 10 is a schematic sectional view taken along a line II-II in FIG. 9.
Figure 11:
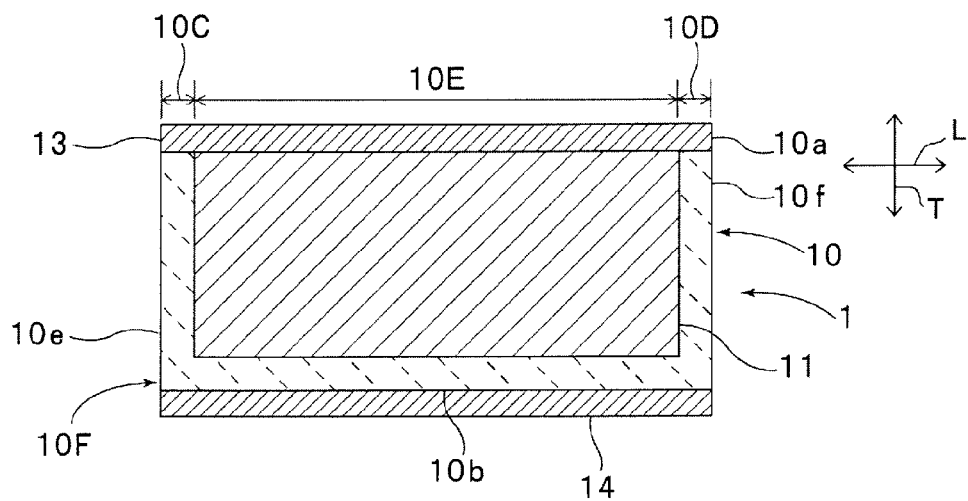
FIG. 11 is a schematic sectional view taken along a line III-III in FIG. 9.

The present invention is not limited to the above-described monolithic ceramic capacitor according to the first preferred embodiment, and the present invention can provide monolithic ceramic capacitors of various structures. FIG. 9 is a schematic perspective view of a ceramic capacitor according to a second preferred embodiment of the present invention. FIG. 10 is a sectional view of a portion taken along a line II-II in FIG. 9, FIG. 11 is a sectional view taken along a line III-III in FIG. 9, and FIG. 12 is a sectional view taken along a line IV-IV in FIG. 9.

As illustrated in FIG. 9, a monolithic ceramic capacitor 101 according to the present preferred embodiment includes a ceramic sintered body 10 preferably having a parallelepiped shape. The ceramic sintered body 10 includes first and second principal surfaces 10a and 10b, first and second lateral surfaces 10c and 10d, and first and second end surfaces 10e and 10f. The first and second principal surfaces 10a and 10b extend in a lengthwise direction L and a widthwise direction W. The first and second lateral surfaces 10c and 10d extend in the lengthwise direction L and a thickness direction T. The first and second end surfaces 10e and 10f extend in the widthwise direction W and the thickness direction T.

Dimensions of the ceramic sintered body 10 are not limited to particular ones. A length of the ceramic sintered body 10 in the lengthwise direction L can be set to, e.g., about 0.4 mm to about 3.2 mm. A length of the ceramic sintered body 10 in the widthwise direction W can be set to, e.g., about 0.2 mm to about 2.6 mm. A length of the ceramic sintered body 10 in the thickness direction T can be set to, e.g., about 0.2 mm to about 2.6 mm.

Figure 12:
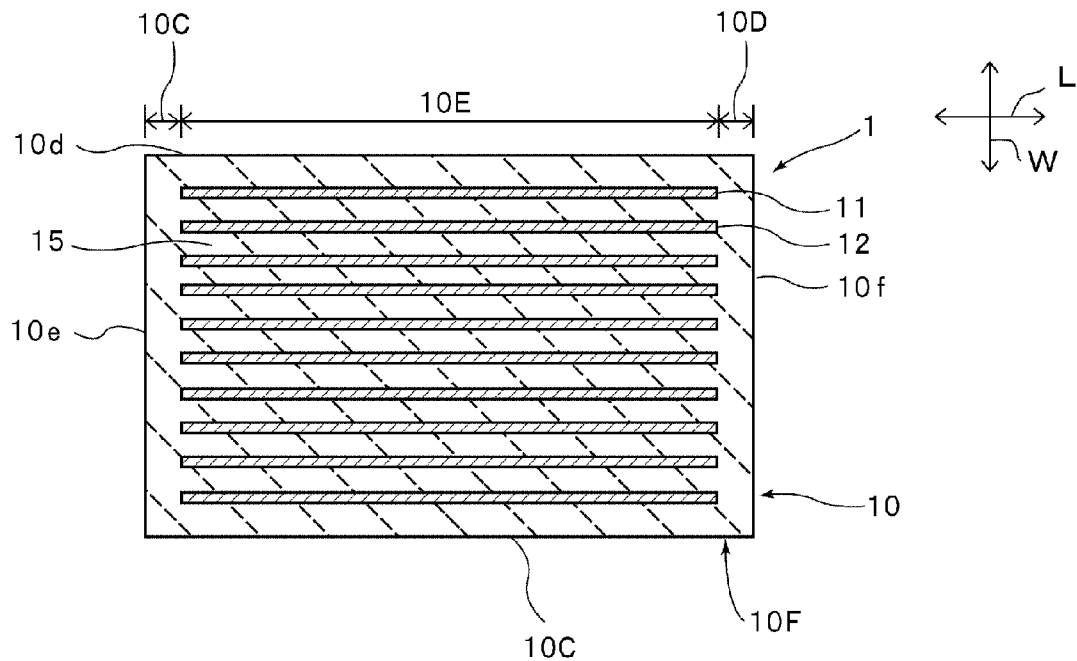
FIG. 12 is a schematic sectional view taken along a line IV-IV in FIG. 9.

The ceramic sintered body 10 includes a plurality of stacked ceramic layers 15 (see FIGS. 10 and 12). The ceramic layers 15 are each made of a ceramic composition containing ceramic. The ceramic composition may contain, in addition to the ceramic, firing aids such as Si, Mg, B and glass components.

Specific examples of a dielectric ceramic primarily contained in the ceramic composition include $BaTiO_3$, $CaTiO_3$, $SrTiO_3$, and $CaZrO_3$. The dielectric ceramic may be added, as appropriate, with auxiliary components, e.g., a Mn compound, a Mg compound, a Co compound, a Ni compound, and a rare-earth compound.

As illustrated in FIGS. 10 and 12, a plurality of first and second inner electrodes 11 and 12 are disposed inside the ceramic sintered body 10. The first and second inner electrodes 11 and 12 are each disposed parallel or substantially parallel to the first and second lateral surfaces 10c and 10d. Each of the first and second inner electrodes 11 and 12 preferably has a rectangular or substantially rectangular shape in plan view. The plurality of first and second inner electrodes 11 and 12 are alternately disposed to be opposed to each other in the widthwise direction W (stacking direction) with the ceramic layer 15 interposed between the adjacent first and second inner electrodes 11 and 12. A thickness of the ceramic layer 15 in the widthwise direction W is not limited to particular one. The thickness of the ceramic layer 15 in the widthwise direction W is preferably in the range of about 0.3 μm to about 0.7 μm, for example. If the thickness of the ceramic layer 15 in the widthwise direction W is smaller than about 0.3 μm, dielectric breakdown may become more likely to occur in some cases. This may often degrade reliability of the monolithic ceramic capacitor 101.

The first inner electrodes 11 are exposed to the first principal surface 10a, but they are not exposed to the second principal surface 10b, the first and second lateral surfaces 10c and 10d, and the first and second end surfaces 10e and 10f. On the other hand, the second inner electrodes 12 are exposed to the second principal surface 10b, but they are not exposed to the first principal surface 10a, the first and second lateral surfaces 10c and 10d, and the first and second end surfaces 10e and 10f.

A thickness of each of the first and second inner electrode 11 and 12 in the widthwise direction W is also not limited to particular one. The thickness of each of the first and second inner electrode 11 and 12 in the widthwise direction W can be set to about 0.2 μm to about 0.6 μm, for example.

A first outer electrode 13 is disposed on the first principal surface 10a. The first outer electrode 13 is connected to the first inner electrodes 11. On the other hand, a second outer electrode 14 is disposed on the second principal surface 10b. The second outer electrode 14 is connected to the second inner electrodes 12.

Materials of the first and second inner electrodes 11 and 12 and the first and second outer electrodes 13 and 14 are not limited to particular ones as long as the materials are electrically conductive. The first and second inner electrodes 11 and 12 and the first and second outer electrodes 13 and 14 can be made of, e.g., a metal such as Ag, Au, Pt, Pd, Ni, Cr or Cu, or an alloy containing one or more of those metals. Further, the first and second inner electrodes 11 and 12 and the first and second outer electrodes 13 and 14 may be each formed as a laminate including plural conductive films.

As illustrated in FIGS. 10 to 12, the ceramic sintered body 10 includes first and second outer layer portions 10A and 10B, first and second side gap portions 10C and 10D, and an inner layer portion 10E.

The inner layer portion 10E indicates a portion of the ceramic sintered body 10, the portion being positioned in a region where at least one of the first and second inner electrodes 11 and 12 is disposed when viewed from the widthwise direction W (stacking direction). The inner layer portion 10E includes an opposed portion 10E1 and a not-opposed portion 10E2. The opposed portion 10E1 indicates a portion positioned in a region where the first and second inner electrodes 11 and 12 are opposed to each other in the widthwise direction W (stacking direction). Thus, in this preferred embodiment, the opposed portion 10E1 constitutes the first portion. Of the ceramic sintered body 10, a portion except for the opposed portion 10E1, i.e., the not-opposed portion 10E2, the first and second outer layer portions 10A and 10B, and the first and second side gap portions 10C and 10D, constitute a second portion 10F. The second portion 10F is positioned outside the opposed portion 10E1 constituting the first portion.

The not-opposed portion 10E2 indicates a portion where the first or second inner electrodes 11 or 12 are disposed, when viewed from the widthwise direction W (stacking direction). The not-opposed portion 10E2 is positioned at each of opposite end portions of the ceramic sintered body 10 in the thickness direction T (second direction).

The first and second outer layer portions 10A and 10B and the first and second side gap portions 10C and 10D indicate portions where the first and second inner electrodes 11 and 12 are both not disposed. The first and second outer layer portions 10A and 10B are positioned at opposite end portions of the ceramic sintered body 10 in the widthwise direction W. On the other hand, the first and second side gap portions 10C and 10D are positioned at opposite end portions of the ceramic sintered body 10 in the lengthwise direction L (first direction).

Also in this preferred embodiment, the ratio (Ic/Ia) of the peak intensity (Ic) to the peak intensity (Ia) measured with the XRD analysis of the ceramic layer in the ceramic sintered body is about 2 or more. As a result, the second preferred embodiment can provide similar advantageous effects to those in the first preferred embodiment.

Further, the monolithic ceramic capacitor 101 according to the present preferred embodiment can also be manufactured by a similar method to that of manufacturing the monolithic ceramic capacitor 2 according to the first preferred embodiment.

When the monolithic ceramic capacitor 101 according to the present preferred embodiment is manufactured, the above-described method of preparing a laminate in which the first and second side gap portions 10C and 10D are not formed, and then forming ceramic layers, which form the first and second side gap portions 10C and 10D, is also preferably used. By firing the thus-obtained ceramic laminate, the ceramic sintered body 10 can be obtained. As a result, sizes of the side gap portions 10C and 10D in the first direction can be reduced.

Also in the present preferred embodiment, a length of each of the side gap portions 10C and 10D in the first direction after the firing is preferably about 45 μm or less. Moreover, also in the present preferred embodiment, a length of each of the not-opposed portions in the second direction is also preferably about 57.5 μm or less. Based on these conditions, an area of the opposed portion where the first and second inner electrodes are opposed to each other can be increased.

A modification of the foregoing preferred embodiments will be described below. It is to be noted that, in the following description of the modification, members having functions substantially in common to those in the foregoing preferred embodiments are denoted by common symbols and descriptions of those members are omitted.

The foregoing preferred embodiments have been described in connection with an example in which the first and second inner electrodes 11 and 12 are parallel or substantially parallel to the first and second lateral surfaces 10c and 10d, and the first inner electrodes 11 are led out to the first principal surface 10a, while the second inner electrodes 12 are led out to the second principal surface 10b. In the present invention, however, the arrangement of the first and second inner electrodes is not limited to any particular one as long as gap layers are formed in the ceramic sintered body.

For example, the first and second inner electrodes may be parallel or substantially parallel to the first and second principal surfaces or to the first and second end surfaces.

EXAMPLES

The monolithic ceramic capacitor according to the first preferred embodiment, illustrated in FIG. 1, was fabricated by the above-described manufacturing method in accordance with non-limiting examples of design parameters mentioned below.

Composition of the ceramic layer 15: $BaTiO_3$
Layer thickness of the ceramic layer 15: 0.8 μm
Dimensions of the ceramic sintered body: 1.0 mm×0.5 mm×0.5 mm (tolerance±0.1 mm)
Thickness of the outer layer (on one side): 36 μm
Material of the inner electrode: Ni
Thickness of the inner electrode: 0.5 μm
Layer number of the inner electrodes: 380 layers
Firing temperature: 1200° C.
Material of the outer electrode: Cu (including Ni and Sn plated thereon)
Baking temperature for the outer electrode: 800° C.

Further, Samples 1 to 8 of the monolithic ceramic capacitor 2 were fabricated by variously setting the sizes of the side gap portions 10C and 10D in the widthwise direction, the size of the not-opposed portion in the lengthwise direction of the ceramic sintered body 10 where the first inner electrodes 11 and the second inner electrodes 12 are not opposed to each other, and an area rate of the opposed portion, i.e., a proportion of an area occupied by the opposed portion in the ceramic sintered body 10 when viewed from the stacking direction, to different values as listed in Table 1 below. Samples 1 to 4 were fabricated by the related-art method of not additionally forming the side gap portions later. Samples 5 to 8 were fabricated by the method of additionally forming the side gap portions later.

For the monolithic ceramic capacitors thus obtained, peak intensity with an XRD analysis was measured at a center of the opposed portion in the lengthwise direction L and at an end portion thereof in the widthwise direction W. An XRD apparatus used here was Commodity Number: D8-Discover with GADDS made by Bruker AXS, Inc.

Peak intensity (Ia) at the a-axis (400) and peak intensity (Ic) at the c-axis (004) were determined from the measurement with the XRD analysis, and a ratio Ic/Ia was calculated. The obtained results are listed in Table 1 below.

Further, an electrostatic capacity of each of the fabricated monolithic ceramic capacitors was measured by using an LCR meter (made by Hewlett-Packard Company, Commodity Number: HP4284A) and by applying a voltage of 0.5 Vrms at a frequency of 1 kHz. A relative dielectric constant was determined from the measured electrostatic capacity through calculation. The determined results are listed in Table 1 below.

Figure 13:
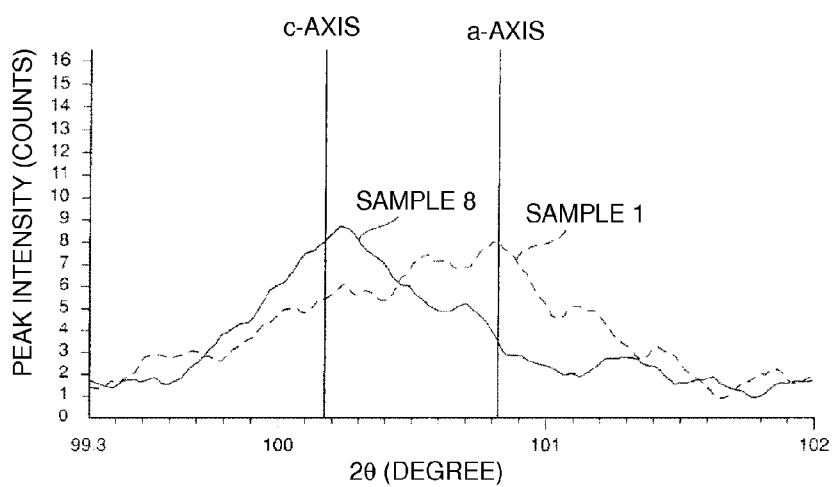
FIG. 13 is a graph plotting peak intensities measured with an XRD analysis of monolithic ceramic capacitors according to EXAMPLES using Samples 1 and 8.

FIG. 13 plots, as representative examples, XRD spectra of Samples 1 and 8 in Table 1. The XRD spectra plotted in FIG. 13 are each a result of performing the measurement in a region (located at a central zone of the opposed portion in the lengthwise direction L and an end zone thereof in the widthwise direction W), which region corresponds to a portion denoted by a broken line X in FIG. 3.

TABLE 1

|   |   | Size of side gap portion (on one side) (μm) | Size of not-opposed portion (on one side) (μm) | Area rate of opposed portion (%) | Ic | Ia | Ic/Ia | Relative dielectric constant |
|---|---|---|---|---|---|---|---|---|
| * | Sample 1 | 55 | 70 | 71.3 | 3.68 | 5.58 | 0.66 | 2135 |
| * | Sample 2 | 55 | 65 | 72 | 3.99 | 4.32 | 0.92 | 2100 |
| * | Sample 3 | 55 | 62.5 | 72.4 | 5.13 | 3.61 | 1.42 | 2211 |
| * | Sample 4 | 50 | 60 | 74.2 | 5.32 | 3.5 | 1.52 | 2193 |
|   | Sample 5 | 45 | 57.5 | 76.1 | 5.92 | 2.89 | 2.05 | 2920 |
|   | Sample 6 | 32.5 | 55 | 80.3 | 6.32 | 2.43 | 2.6 | 3295 |
|   | Sample 7 | 30 | 57.5 | 80.6 | 6.44 | 2.35 | 2.74 | 3365 |
|   | Sample 8 | 30 | 55 | 81 | 6.56 | 2.37 | 2.77 | 3405 |

As seen from Table 1, since the ratio Ic/Ia is about 1.52 or less in Samples 1 to 4, the relative dielectric constant is as low as 2211 or below.

In contrast, it is seen that, in Samples 5 to 8 in which the ratio Ic/Ia is about 2.0 or more, the relative dielectric constant can be greatly increased to about 2920 or more. Further, as seen from the representative example plotted in FIG. 13, Ia is larger than Ic in Sample 1 departing from the scope of the present invention, while Ic is twice or more Ia in Sample 8 according to a preferred embodiment of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic capacitor comprising:
a ceramic sintered body including a plurality of stacked ceramic layers; and
first and second inner electrodes alternately disposed inside the ceramic sintered body to be opposed to each other in a stacking direction of the ceramic layers with one of the ceramic layers being interposed between the adjacent first and second inner electrodes; wherein
the ceramic sintered body includes a first portion in which the first and second inner electrodes are opposed to each other, and a second portion positioned outside the first portion;
in the first portion, the ceramic layers are oriented in the stacking direction, and a ratio (Ic/Ia) of c-axis peak intensity (Ic) to a-axis peak intensity (Ia) measured with an XRD analysis of at least the one of the ceramic layers is about 2 or more;
the ceramic sintered body is a parallelepiped ceramic sintered body including first and second principal surfaces extending in a lengthwise direction and a widthwise direction perpendicular to the lengthwise direction, first and second lateral surfaces extending in a thickness direction perpendicular to both the lengthwise direction and the widthwise direction and in the lengthwise direction, and first and second end surfaces extending in the widthwise direction and the thickness direction;
the first portion is an opposed portion in which the first and second inner electrodes are opposed to each other;
the second portion includes not-opposed portions, which are positioned on both sides of the opposed portion in the lengthwise direction and in which the first and second inner electrodes are not opposed to each other, and side gap portions, which are positioned on both sides of the opposed portion in the widthwise direction and in which the first and second inner electrodes are both not disposed;
a length of each of the side gap portions in the widthwise direction is about 45 µm or less;
the ceramic sintered body is made of a ceramic material having a crystal lattice of a perovskite structure;
a thickness of the one of the ceramic layers is in a range of about 0.3 µm to about 2 µm; and
the thickness of the one of the ceramic layers is in a range of about one to three times a thickness of each of the first and second inner electrodes.

2. The monolithic ceramic capacitor according to claim 1, wherein a proportion of an area occupied by the first portion in the ceramic sintered body is about 80% or more when viewed from the stacking direction.

3. The monolithic ceramic capacitor according to claim 1, wherein a length of each of the not-opposed portions in the lengthwise direction is about 57.5 µm or less.

* * * * *